United States Patent
Akl et al.

(10) Patent No.: US 11,832,320 B2
(45) Date of Patent: Nov. 28, 2023

(54) ON-DEMAND CONNECTIVITY IN AN INTEGRATED ACCESS AND BACKHAUL NETWORK

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/305,432

(22) Filed: Jul. 7, 2021

(65) Prior Publication Data

US 2023/0008281 A1    Jan. 12, 2023

(51) Int. Cl.
*H04W 76/12* (2018.01)

(52) U.S. Cl.
CPC .................................. *H04W 76/12* (2018.02)

(58) Field of Classification Search
CPC . H04W 76/12; H04W 84/047; H04W 88/085; H04W 76/27
See application file for complete search history.

(56) References Cited

U.S. PATENT DOCUMENTS

| | | | | |
|---|---|---|---|---|
| 2021/0297892 A1* | 9/2021 | Teyeb | .................... | H04W 40/22 |
| 2021/0377840 A1* | 12/2021 | Zhu | ....................... | H04W 40/02 |
| 2022/0070732 A1* | 3/2022 | Wang | ................. | H04W 28/0804 |
| 2022/0264447 A1* | 8/2022 | Byun | ................. | H04W 52/0235 |
| 2022/0361067 A1* | 11/2022 | Koskinen | .......... | H04W 36/0061 |
| 2023/0007701 A1* | 1/2023 | Laselva | ................. | H04W 76/30 |
| 2023/0089657 A1* | 3/2023 | Ishii | ....................... | H04W 76/19 |
| 2023/0098848 A1* | 3/2023 | Ishii | ................... | H04W 36/0055 |
| | | | | 370/216 |

(Continued)

OTHER PUBLICATIONS

Huawei: "Discussion on IAB Inactive", 3GPP TSG-RAN WG3 meeting #108-e, R3-203842, 3rd Generation Partnership Project (3GPP), Mobile Competence Centre, 650, Route Des Lucioles, F-06921 Sophia-Antipolis Cedex, France, vol. RAN WG3, No. Online, Jun. 1, 2020-Jun. 11, 2020, May 22, 2020 (May 22, 2020), XP051889525, 2 Pages, Paragraph [0002].

(Continued)

*Primary Examiner* — Habte Mered
(74) *Attorney, Agent, or Firm* — Harrity & Harrity, LLP/Qualcomm Incorporated

(57) ABSTRACT

Various aspects of the present disclosure generally relate to wireless communication. In some aspects, an integrated access and backhaul (IAB)-donor central unit (CU) may trigger connectivity between a distributed unit (DU) of a first network node and the IAB-donor CU, wherein the first network node comprises an IAB-node. The IAB may instantiate connectivity between a mobile terminal (MT) of the first network node and the IAB-donor CU after instantiation of the connectivity between the DU of the first network node and the IAB-donor CU. The IAB may transmit a communication to a second network node via the first network node. Numerous other aspects are described.

30 Claims, 11 Drawing Sheets

(56) References Cited

U.S. PATENT DOCUMENTS

2023/0164658 A1* 5/2023 Ishii .................... H04W 36/305
370/331

OTHER PUBLICATIONS

International Search Report and Written Opinion—PCT/US2022/072780—ISA/EPO—dated Sep. 19, 2022.
Qualcomm Incorporated (Mediator): "Rel-17 IAB Email Discussion—Report", 3GPP TSG RAN meeting #86, RP-193094, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 8, 2019 (Dec. 8, 2019), 39 Pages, XP051838727, p. 13-p. 14.
Samsung: "IAB RRC State Machine", 3GPP TSG-RAN WG2 Meeting #105-Bis, R2-1904181, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8, 2019-Apr. 12, 2019, Apr. 6, 2019 (Apr. 6, 2019), XP051701494, 4 Pages.
ZTE: "Summary of IAB Particular Issues I Mise (ZTE)", 3GPP TSG-RAN WG2 Meeting #110, R2-2006319 (R2-20xxxxx), 3rd Generation Partnership Project (3GPP), Mobile Competence Centre, 650, Route Des Lucioles, F-06921 Sophia-Antipolis Cedex, France, vol. RAN WG2, No. Online, Jun. 1, 2020-Jun. 12, 2020, Jun. 15, 2020 (Jun. 15, 2020), XP051898296, 17 Pages, paragraph [02.4].

\* cited by examiner

ON-DEMAND CONNECTIVITY IN AN INTEGRATED ACCESS AND BACKHAUL NETWORK

FIELD OF THE DISCLOSURE

Aspects of the present disclosure generally relate to wireless communication and to techniques and apparatuses for on-demand connectivity in an integrated access and backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at an integrated access and backhaul (IAB)-donor central unit (CU). The apparatus may include a memory. The apparatus may include one or more processors, coupled to the memory, configured to trigger connectivity between a distributed unit (DU) of a first network node and the IAB-donor CU, where the first network node comprises an IAB node; instantiate connectivity between a mobile terminal (MT) of the first network node and the IAB-donor CU after instantiation of the connectivity between the DU of the first network node and the IAB-donor CU; and transmit a communication to a second network node via the first network node.

Some aspects described herein relate to an apparatus for wireless communication at a first network node of an IAB network. The apparatus may include a memory. The apparatus may include one or more processors, coupled to the memory, configured, receive a connectivity trigger from a second network node of the IAB network, where the second network node comprises at least one of an IAB node, a user equipment (UE), or an IAB-donor CU; instantiate connectivity between an MT of the first network node and the IAB-donor CU after instantiation of connectivity between a DU of the first network node and the IAB-donor CU; and relay traffic between the second network node and the IAB-donor CU.

Some aspects described herein relate to a method of wireless communication performed by an IAB-donor CU. The method may include triggering connectivity between a DU of a first network node and the IAB-donor CU, wherein the first network node comprises an IAB node. The method may include instantiating connectivity between an MT of the first network node and the IAB-donor CU after instantiation of the connectivity between the DU of the first network node and the IAB-donor CU. The method may include transmitting a communication to a second network node via the first network node.

Some aspects described herein relate to a method of wireless communication performed by a first network node of an IAB network. The method may include receiving a connectivity trigger from a second network node of the IAB network, wherein the second network node comprises at least one of an IAB node, a UE, or an IAB-donor CU. The method may include instantiating connectivity between an MT of the first network node and the IAB-donor CU after instantiation of connectivity between a DU of the first network node and the IAB-donor CU. The method may include relaying traffic between the second network node and the IAB-donor CU.

Some aspects described herein relate to a non-transitory computer-readable medium that stores a set of instructions for wireless communication that are executed by one or more processors of an IAB-donor CU of an IAB network. The set of instructions, when executed by the one or more processors, may cause the IAB-donor CU to trigger connectivity between a DU of a first network node and the IAB-donor CU, wherein the first network node comprises an IAB-node. The set of instructions, when executed by the one or more processors, may cause the IAB-donor CU to instantiate connectivity between an MT of the first network node and the IAB-donor CU after instantiation of the connectivity between the DU of the first network node and the IAB-donor CU. The set of instructions, when executed by the one or more processors, may cause the IAB-donor CU to transmit a communication to a second network node via the first network node.

Some aspects described herein relate to a non-transitory computer-readable medium that stores a set of instructions for wireless communication by a first network node of an IAB network. The set of instructions, when executed by one or more processors of the IAB, may cause the IAB to receive a connectivity trigger from a second network node of the IAB network, wherein the second network node comprises at least one of an IAB-node, a UE, or an IAB-donor CU. The set of instructions, when executed by one or more processors of the IAB, may cause the IAB to instantiate connectivity between an MT of the first network node and the IAB-donor CU after instantiation of connectivity between a DU of the first network node and the IAB-donor CU. The set of instructions, when executed by one or more processors of the IAB, may cause the IAB to relay traffic between the second network node and the IAB-donor CU.

Some aspects described herein relate to an apparatus for wireless communication. The apparatus may include means for triggering connectivity between a DU of a first network node of an IAB network and the apparatus, wherein the first network node comprises an IAB-node. The apparatus may include means for instantiating connectivity between an MT of the first network node and the apparatus after instantiation of the connectivity between the DU of the first network node and the apparatus. The apparatus may include means for transmitting a communication to a second network node via the first network node.

Some aspects described herein relate to an apparatus for wireless communication. The apparatus may include means for receiving a connectivity trigger from a network node of an IAB network, wherein the network node comprises at least one of an IAB-node, a UE, or an IAB-donor CU. The apparatus may include means for instantiating connectivity between an MT of the apparatus and the IAB-donor CU after instantiation of connectivity between a DU of the apparatus and the IAB-donor CU. The apparatus may include means for relaying traffic between the network node and the IAB-donor CU.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
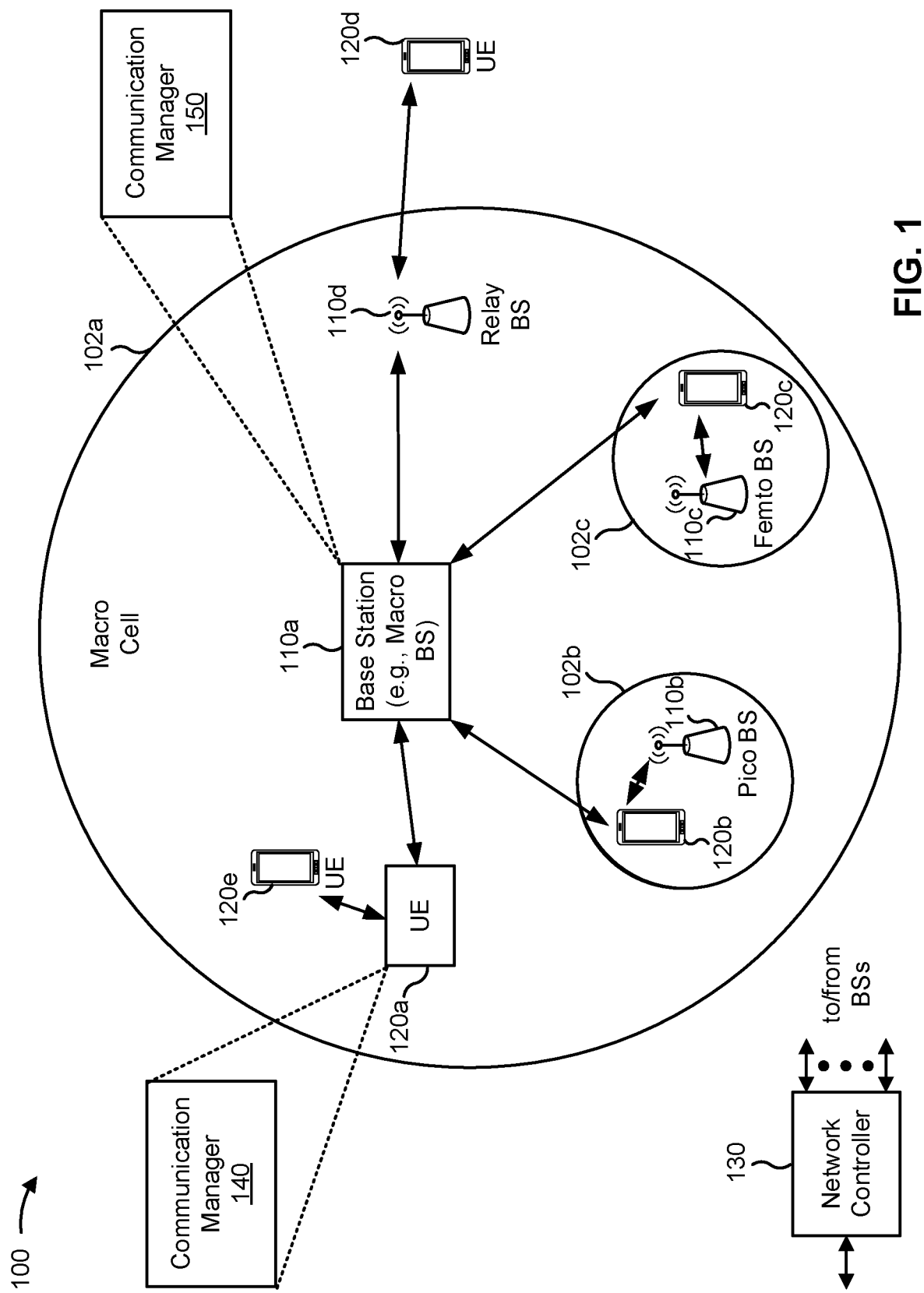
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB-donor (or IAB-donor), a central entity, a central unit, an IAB-donor CU, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic. In some aspects, base stations, IAB-donor CUs, IAB nodes, and/or UEs may be referred to as network nodes.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first network node (which may be, or include, a UE 120 and/or a base station 110) may include a communication manager 140 or 150. As described in more detail elsewhere herein, the communication manager 140 or 150 may receive a connectivity trigger from a second network node of the IAB network, wherein the second network node comprises at least one of an IAB-node, a UE, or an IAB-donor CU; instantiate connectivity between an MT of the first network node and the IAB-donor CU after instantiation of connectivity between a DU of the first network node and the IAB-donor CU; and relay traffic between the second network node and the IAB-donor CU. Additionally, or alternatively, the communication manager 140 or 150 may perform one or more other operations described herein.

In some aspects, an IAB-donor CU (which may include a base station 110) may include a communication manager 150. As described in more detail elsewhere herein, the communication manager 150 may trigger connectivity between a DU of a first network node and the IAB-donor CU, wherein the first network node comprises an IAB-node; instantiate connectivity between an MT of the first network node and the IAB-donor CU after instantiation of the connectivity between the DU of the first network node and the IAB-donor CU; and transmit a communication to a second network node via the first network node. Additionally, or alternatively, the communication manager 150 may perform one or more other operations described herein.

As indicated above, FIG. 1 is provided as an example. Other examples may differ from what is described with regard to FIG. 1.

Figure 2:
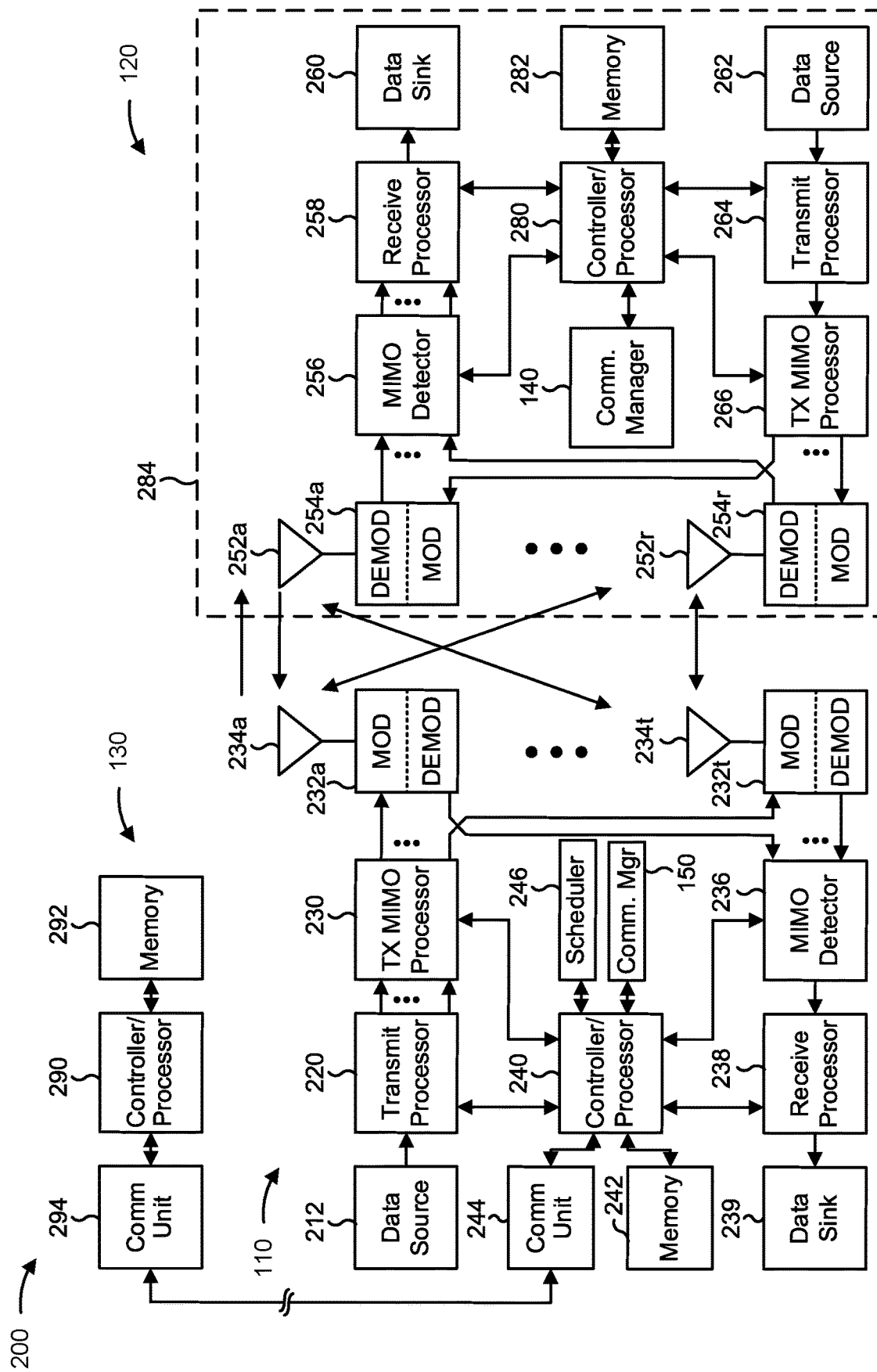
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the base station 110, the controller/processor 280 of the UE 120, and/or any other component(s) of FIG. 2 may perform one or more techniques associated with on-demand connectivity in an IAB network, as described in more detail elsewhere herein. In some aspects, the IAB-node and/or the network node described herein is the base station 110, is included in the base station 110, or includes one or more components of the base station 110 shown in FIG. 2. In some aspects, the IAB-node and/or the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, an IAB-donor CU includes means for triggering connectivity between a DU of a first network node and the IAB-donor CU, wherein the first network node comprises an IAB-node (e.g., using controller/processor 240, transmit processor 220, TX MIMO processor 230, modem 232, antenna 234, memory 242, MIMO detector 236, receive processor 238, or the like); means for instantiating connectivity between an MT of the first network node and the IAB-donor CU after instantiation of the connectivity between the DU of the first network node and the IAB-donor CU (e.g., using controller/processor 240, transmit processor 220, TX MIMO processor 230, modem 232, antenna 234, memory 242, MIMO detector 236, receive processor 238, or the like); and/or means for transmitting a communication to a second network node via the first network node (e.g., using controller/processor 240, transmit processor 220, TX MIMO processor 230, modem 232, antenna 234, memory 242, or the like). In some aspects, the means for the IAB-donor CU to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first network node includes means for receiving a connectivity trigger from a second network node of the IAB network, wherein the second network node comprises at least one of an IAB-node, a UE, or an IAB-donor CU (e.g., using antenna 252, modem 254, MIMO detector 256, receive processor 258, controller/processor 280, memory 282, antenna 234, modem 232, MIMO detector 236, receive processor 238, controller/processor 240, memory 242, or the like); means for instantiating connectivity between an MT of the first network node and the IAB-donor CU after instantiation of connectivity between a DU of the first network node and the IAB-donor CU (e.g., using controller/processor 240, transmit processor 220, TX MIMO processor 230, modem 232, antenna 234, memory 242, MIMO detector 236, receive processor 238, controller/processor 280, transmit processor 264, TX MIMO processor 266, modem 254, antenna 252, memory 282, MIMO detector 256, receive processor 258, or the like); and/or means for relaying traffic between the second network node and the IAB-donor CU. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
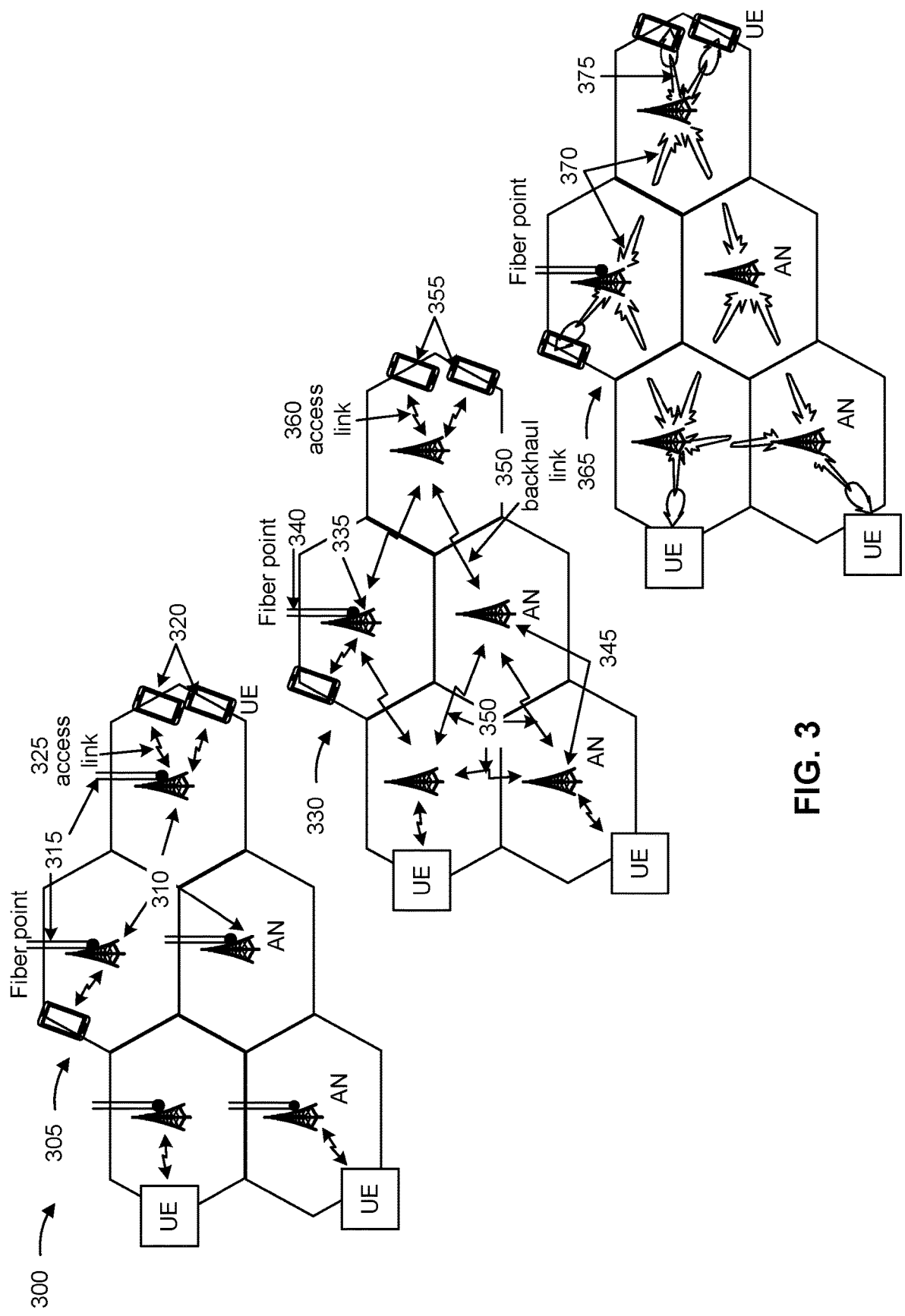
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB-donor (or IAB-donor). The IAB network may include one or more non-anchor base stations 345, sometimes referred to as relay base stations or IAB-nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
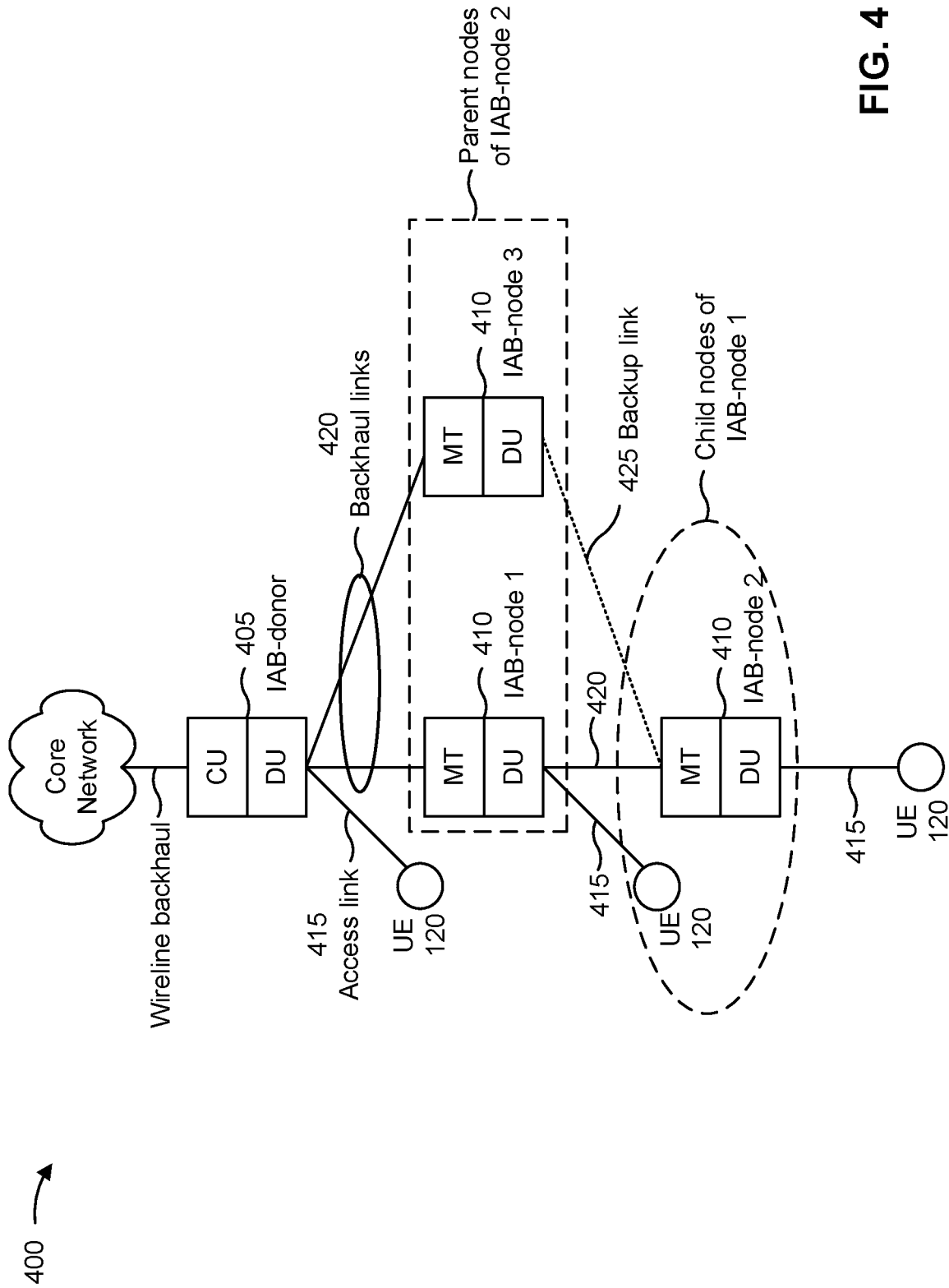
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB-donor 405 (shown as IAB-donor) that connects to a core network via a wired connection (shown as a wireline backhaul). For example, an Ng interface of an IAB-donor 405 may terminate at a core network. Additionally, or alternatively, an IAB-donor 405 may connect to one or more devices of the core network that provide a core access and mobility management function (e.g., AMF). In some aspects, an IAB-donor 405 may include a base station 110, such as an anchor base station, as described above in connection with 3. As shown, an IAB-donor 405 may include a central unit (CU), which may perform access node controller (ANC) functions and/or AMF functions. The CU may configure a distributed unit (DU) of the IAB-donor 405 and/or may configure one or more IAB-nodes 410 (e.g., an MT and/or a DU of an IAB-node 410) that connect to the core network via the IAB-donor 405. Thus, a CU of an IAB-donor 405 may control and/or configure the entire IAB network that connects to the core network via the IAB-donor 405, such as by using control messages and/or configuration messages (e.g., a radio resource control (RRC) configuration message or an F1 application protocol (F1-AP) message).

As further shown in FIG. 4, the IAB network may include IAB-nodes 410 (shown as IAB-node 1, IAB-node 2, and IAB-node 3) that connect to the core network via the IAB-donor 405. As shown, an IAB-node 410 may include mobile termination (MT) functions (also sometimes referred to as UE functions (UEF)) and may include DU functions (also sometimes referred to as access node functions (ANF)). The MT functions of an IAB-node 410 (e.g., a child node) may be controlled and/or scheduled by another IAB-node 410 (e.g., a parent node of the child node) and/or by an IAB-donor 405. The DU functions of an IAB-node 410 (e.g., a parent node) may control and/or schedule other IAB-nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB-donor 405 may include DU functions and not MT functions. That is, an IAB-donor 405 may configure, control, and/or schedule communications of IAB-nodes 410 and/or UEs 120. A UE 120 may include only MT functions, and not DU functions. That is, communications of a UE 120 may be controlled and/or scheduled by an IAB-donor 405 and/or an IAB-node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB-donor 405 or an IAB-node 410, and a child node may be an IAB-node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB-donor 405, or between a UE 120 and an IAB-node 410, may be referred to as an access link 415. Access link 415 may be a wireless access link that provides a UE 120 with radio access to a core network via an IAB-donor 405, and optionally via one or more IAB-nodes 410. Thus, the network illustrated in 4 may be referred to as a multi-hop network or a wireless multi-hop network.

As further shown in FIG. 4, a link between an IAB-donor 405 and an IAB-node 410 or between two IAB-nodes 410 may be referred to as a backhaul link 420. Backhaul link 420 may be a wireless backhaul link that provides an IAB-node 410 with radio access to a core network via an IAB-donor 405, and optionally via one or more other IAB-nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless" node may refer to an IAB-donor 405 or an IAB-node 410.

As indicated above, FIG. 4 is provided as an example. Other examples may differ from what is described with regard to FIG. 4.

Figure 5:
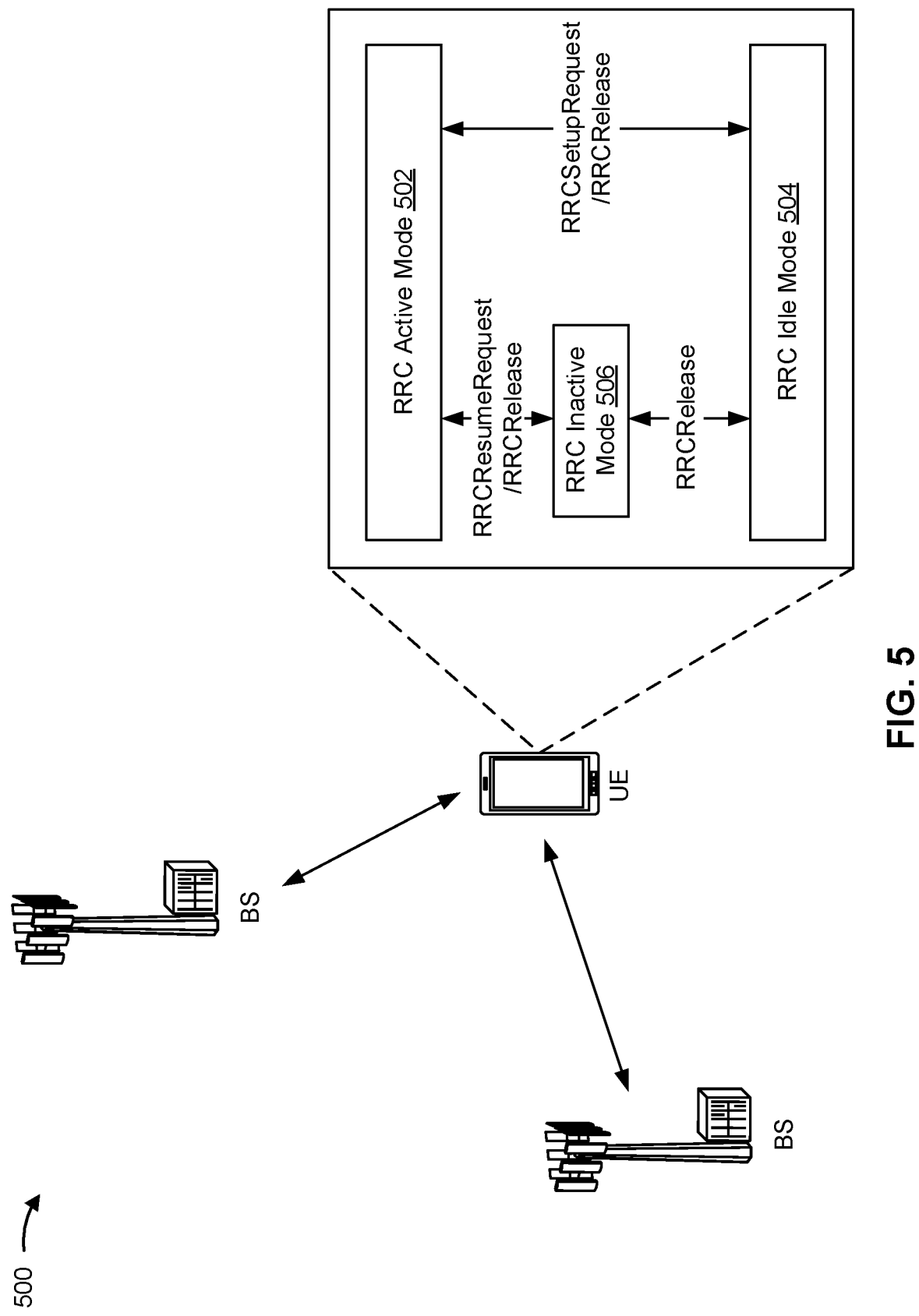
FIG. 5 illustrates an example of a wireless network in which a UE may support additional communication modes, in accordance with the present disclosure.

FIG. 5 illustrates an example 500 of a wireless network (e.g., wireless network 100) in which a UE (e.g., UE 120) may support additional communication modes, in accordance with the present disclosure. In some aspects, the wireless network may be an IAB network. The UE may be communicatively connected with one or more base stations and/or IAB-nodes in the wireless network. For example, the UE may be connected to the one or more base stations in a dual connectivity configuration. In this case, a first base station may serve the UE as a master node and a second base station may serve the UE as a secondary node.

As illustrated in FIG. 5, the UE may support a connected communication mode (e.g., an RRC active mode 502), an idle communication mode (e.g., an RRC idle mode 504), and an inactive communication mode (e.g., an RRC inactive mode 506). RRC inactive mode 506 may functionally reside between RRC active mode 502 and RRC idle mode 504.

The UE may transition between different modes based at least in part on various commands and/or communications received from the one or more base stations. For example, the UE may transition from RRC active mode 502 or RRC inactive mode 506 to RRC idle mode 504 based at least in part on receiving an RRCRelease communication. As another example, the UE may transition from RRC active mode 502 to RRC inactive mode 506 based at least in part on receiving an RRCRelease with suspendConfig communication. As another example, the UE may transition from RRC idle mode 504 to RRC active mode 502 based at least in part on receiving an RRCSetupRequest communication. As another example, the UE may transition from RRC inactive mode 506 to RRC active mode 502 based at least in part on receiving an RRCResumeRequest communication.

When transitioning to RRC inactive mode 506, the UE and/or the one or more base stations may store a UE context (e.g., an access stratum (AS) context and/or higher-layer configurations). This permits the UE and/or the one or more base stations to apply the stored UE context when the UE transitions from RRC inactive mode 506 to RRC active mode 502 in order to resume communications with the one or more base stations, which reduces latency of transitioning to RRC active mode 502 relative to transitioning to the RRC active mode 502 from RRC idle mode 504.

In some cases, the UE may communicatively connect with a new master node when transitioning from RRC idle mode 504 or RRC inactive mode 506 to RRC active mode 502 (e.g., a master node that is different from the last serving master node when the UE transitioned to RRC idle mode 504 or RRC inactive mode 506). In this case, the new master node may be responsible for identifying a secondary node for the UE in the dual connectivity configuration.

In some aspects, one or more of the BSs depicted in FIG. 5 may include network nodes of an IAB network. Some aspects facilitate on-demand transitioning between RRC states discussed above in IAB networks.

As indicated above, FIG. 5 is provided as an example. Other examples may differ from what is described with regard to FIG. 5.

Figure 6:
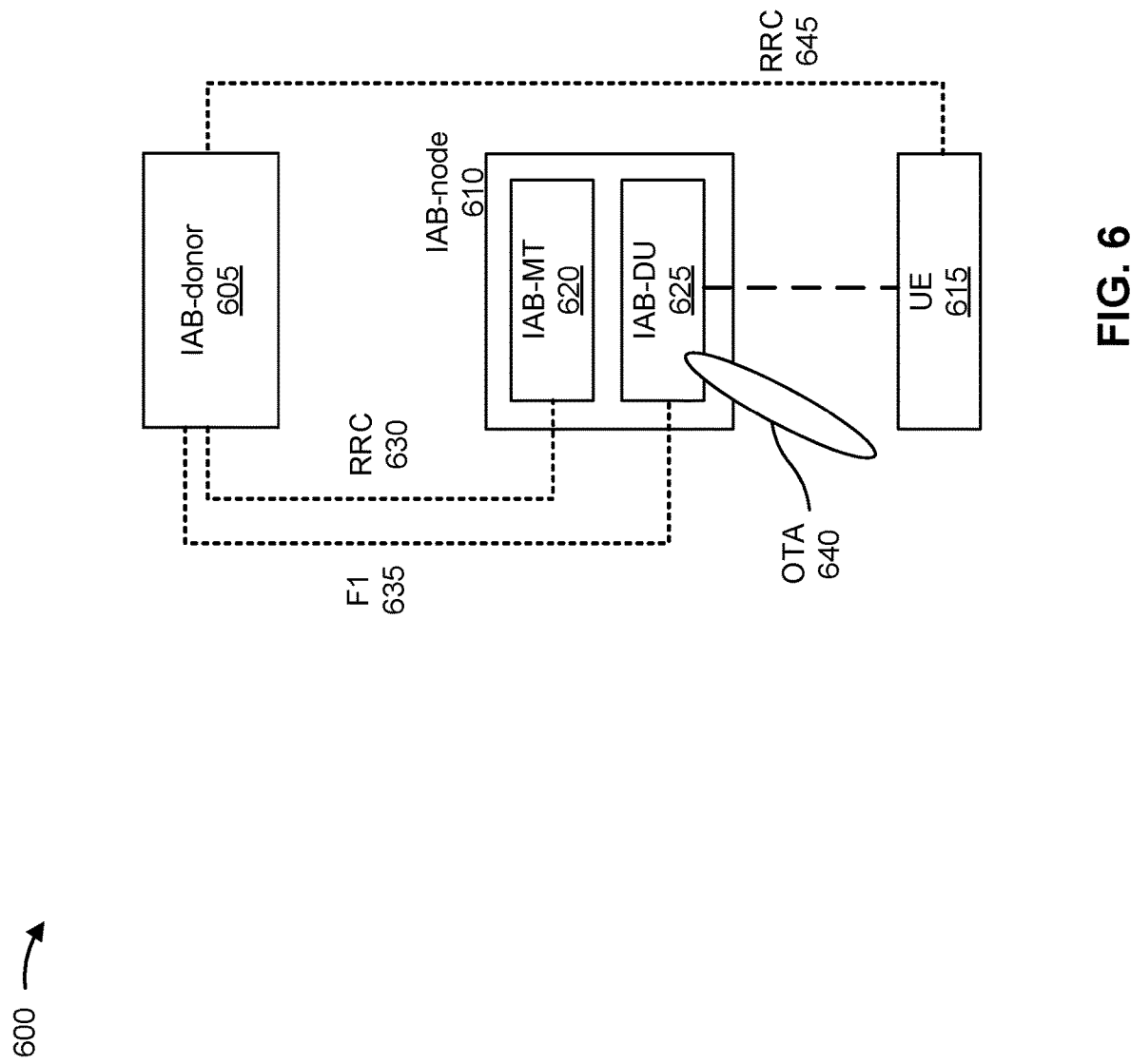
FIG. 6 is a diagram illustrating an example associated with connectivity in an IAB network, in accordance with the present disclosure.

FIG. 6 is a diagram illustrating an example 600 associated with on-demand connectivity in an IAB network, in accordance with the present disclosure. As shown, an IAB-donor CU 605 and an IAB-node 610 may communicate with one another. The IAB-node 610 may include a parent IAB-node and/or a child IAB-node. The IAB-node 610 may be configured to serve one or more network nodes such as, for example, one or more IAB-nodes and/or one or more UEs 615. As shown, the IAB-node 610 includes an IAB-MT 620 and an IAB-DU 625.

The IAB-MT 620 of the IAB-node 610 may be connected to the IAB-donor CU 605 via an RRC connection 630 and the IAB-DU 625 of the IAB-node 610 may be connected to the IAB-donor CU 605 via an F1 connection 635 (which may also be referred to as an F1 interface). The IAB-node 610 may serve one or more other network nodes such as, for example, one or more child IAB-nodes (not shown) and/or one or more UEs 615. In some cases, an over-the-air (OTA) connection 640 may be instantiated between the UE 615 and the IAB-node 610. The OTA connection 640 may enable the UE 615 to detect the IAB-node 610 and/or connect to the DU 625. When the UE 615 is in a connected state, the UE 615 can have an RRC connection 645 with the IAB-donor CU 605. The RRC connection 645 can be maintained when the UE 615 is in an inactive RRC state (e.g., where the UE 615 is not being served by the DU 625).

In some cases, the IAB-DU 625 can maintain OTA transmissions to invite UEs for initial access or to prevent radio link failure for connected UEs with low-activity bearers. At the same time, the IAB-MT 620 can transition to RRC inactive, thereby allowing for energy savings. However, transitioning to RRC inactive can result in a disconnected backhaul for child nodes of the IAB-node 610, since the F1 635 connection generally is not maintained without RRC connectivity via the RRC connection 630. In some cases, connectivity can be reestablished by instantiating RRC connection 630 between the IAB-MT 620 and the IAB-donor CU 605 and, only after RRC connection is instantiated, instantiating the F1 connection 635 between the IAB-DU 625 and the IAB-donor CU 605. The RRC connection 630 can reduce energy savings, but such savings may result in negative impacts to network performance.

Some aspects of the techniques and apparatuses described herein may facilitate energy savings by providing on-demand connectivity in an IAB network. In some aspects, for example, energy savings may be achieved by decoupling the RRC connection 630 between the IAB-node 610 and the IAB-donor CU 610 from the F1 connection 635 between the IAB-node 610 and the IAB-donor CU 610 and/or by decoupling the F1 connection 635 between the IAB-node 610 and the IAB-donor CU 610 from the OTA connection 640 with the UEs.

In some aspects, an IAB-donor CU may trigger connectivity between a DU of a first network node and the IAB-donor CU, where the first network node comprises an IAB-node. The IAB-donor CU may instantiate connectivity between an MT of the first network node and the IAB-donor CU after instantiation of the connectivity between the DU of the first network node and the IAB-donor CU, and may transmit a communication to a second network node via the first network node. For example, an IAB-MT may move to RRC inactive for energy saving while the F1 connection of the IAB-DU may not be released. In this case, the F1 connection does not have to be re-established following the resumption of the IAB-MT connection.

For example, an IAB-donor-CU may page an IAB-MT in RRC inactive state, then the IAB-node may resume connectivity with the donor, after which the IAB-donor pages or sends traffic to a UE via the IAB-node. Similarly, in uplink, a UE may attempt initial access or send upstream traffic to the IAB-DU, which may trigger the IAB-node to resume connectivity with the IAB-donor-CU and complete the UE connection attempt and/or forward UE traffic.

In this way, some aspects may facilitate on-demand connectivity between an IAB-node and an IAB-donor to maximize energy saving of IAB-nodes and only disconnect backhaul when there is limited to no impact on child and/or descendant UEs, thereby having positive impacts on network performance.

As indicated above, FIG. 6 is provided as an example. Other examples may differ from what is described with regard to FIG. 6.

Figure 7:
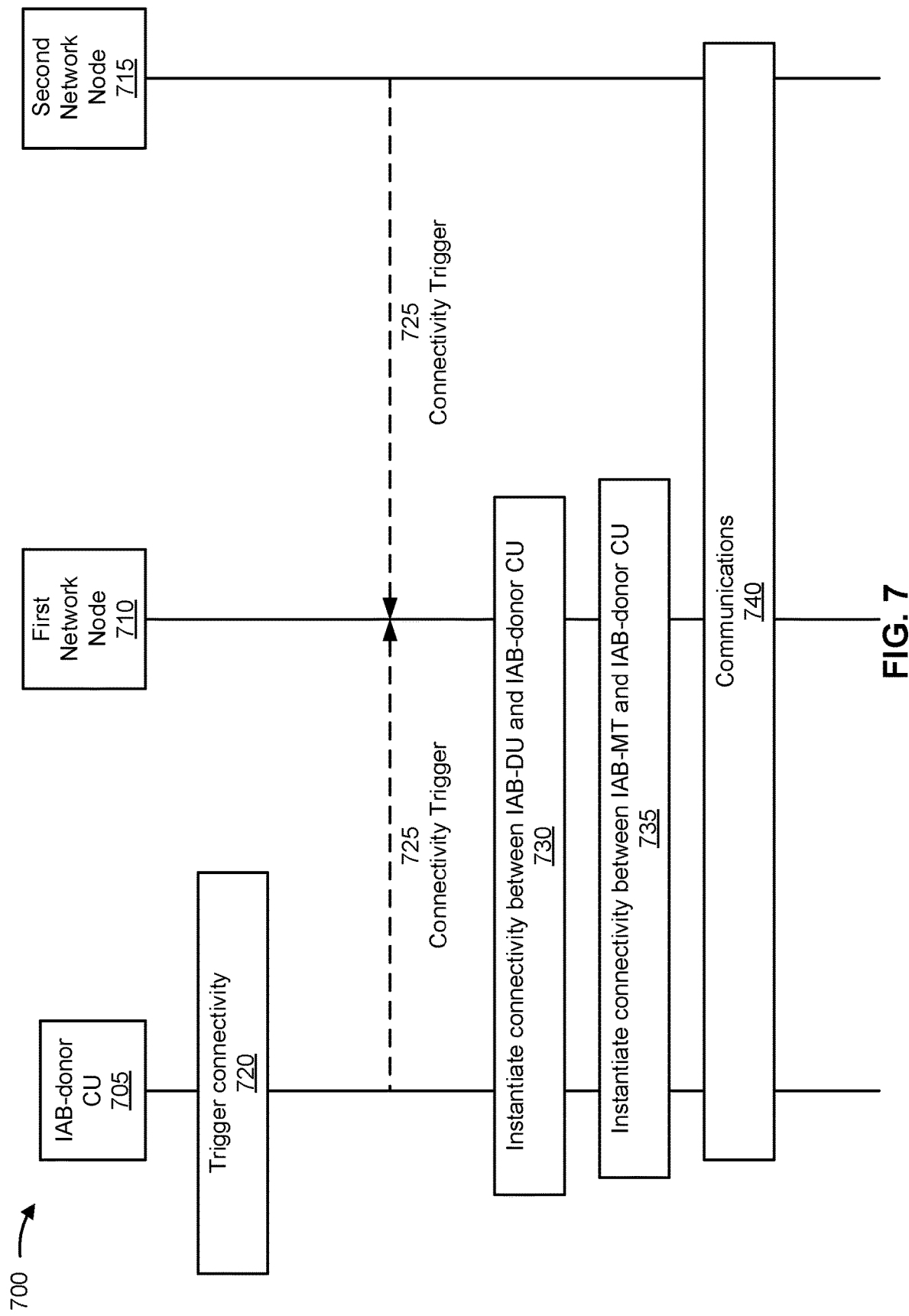
FIG. 7 is a diagram illustrating an example associated with on-demand connectivity in an IAB network, in accordance with the present disclosure.

FIG. 7 is a diagram illustrating an example 700 associated with on-demand connectivity in an IAB network, in accordance with the present disclosure. As shown in FIG. 7, an IAB-donor CU 705 and a first network node 710 may communicate with one another. The first network node 710 may communicate with a second network node 715. In some aspects, the second network node 715 may be a child of the first network node 710. In some aspects, the second network node 715 may be a child of a child of the first network node 710. In some aspects, the first network node 710 and/or the second network node 715 may be, include, or be included in, an IAB-node and/or a UE, among other examples.

As shown by reference number 720, the IAB-donor CU 705 may trigger connectivity between a DU of the first network node 710 and the IAB-donor CU 705. The IAB-donor CU 705 may trigger connectivity by initiating an occurrence of a connectivity trigger event. For example, in some aspects, the IAB-donor CU 705 may trigger connectivity by paging the MT of the first network node 710. In some aspects, the IAB-donor CU 705 may receive traffic for the second network node 715 and may initiate the occurrence of the connectivity trigger based at least in part on receiving the traffic for the second network node. In some aspects, the IAB-donor CU 705 may include an IAB-donor CU control plane (CP) and at least one IAB-donor CU user plane (UP). The IAB-donor CU may receive, using the IAB-donor CU CP, a traffic notification from the IAB-donor CU UP.

As shown by reference number 725, the first network node 710 may receive a connectivity trigger from a second network node of the IAB network. In some aspects, the second network node 715 may include an IAB-node, a UE, or an IAB-donor CU, among other examples. In some aspects, the first network node 710 may receive the connectivity trigger by receiving a paging message for the MT of the first network node from the IAB-donor CU 705. In some aspects, the first network node 710 may receive the connectivity trigger by receiving an indication of an access attempt of the second network node 715. In some aspects, the access attempt may correspond to an attempt, by the second network node 715, to initiate at least one of an initial access procedure, a connection resume procedure, a connection reestablishment procedure, or a random access channel (RACH) procedure. In some aspects, the first network node 710 may receive the connectivity trigger by receiving traffic from the second network node 715.

As shown by reference number 730, the IAB-donor CU 705 and/or the first network node 710 may instantiate the connectivity between the DU of the first network node 710 and the IAB-donor CU 705. In some aspects, instantiating the connectivity between the DU of the first network node 710 and the IAB-donor CU 705 comprises at least one of establishing an F1 interface between the DU of the first network node 710 and the IAB-donor CU 705 or activating the F1 interface. For example, in some aspects, instantiating the connectivity between the DU of the first network node 710 and the IAB-donor CU 705 may include at least one of performing an F1 setup procedure or communicating at least one F1 application protocol (F1AP) message.

As shown by reference number 735, the IAB-donor CU 705 and/or the first network node 710 may instantiate connectivity between an MT of the first network node 710 and the IAB-donor CU 705 after instantiation of the connectivity between the DU of the first network node 710 and the IAB-donor CU 705. In some aspects, instantiating the connectivity between the MT of the first network node 710 and the IAB-donor CU 705 may include establishing an RRC connection between the MT of the first network node 710 and the IAB-donor CU 705. In some aspects, instantiating the connectivity between the MT of the first network node 710 and the IAB-donor CU 705 may include transitioning the MT of the first network node 710 to an RRC connected state from at least one of an RRC idle state or an RRC inactive state.

In some aspects, the step 730 may precede step 725. For example, the F1 connection may be up and then the IAB-MT connection may be released. Because the F1 connection has not been released, the communication 740 using the F1 connection may be triggered any time. For instance, since the F1 connection is instantiated, the donor-CU may want to page the second node via the cells (served by the first node) associated with the F1 connection or send traffic to the second node, or there may be OTA signaling associated with the those cells that triggers the second node to connect or send traffic via the first node. Thus, the step 725 may be triggered (upon which MT connectivity 735 is resumed). In this way, the connectivity of the IAB node may be demand-based, which may maximize energy saving without impacting performance.

As shown by reference number 740, the on-demand connectivity described above may facilitate communications among two or more of the IAB-donor CU 705, the first network node 710, and the second network node 715. For example, the IAB-donor CU 705 may transmit a communication to the second network node 715 via the first network node 710. The first network node 710 may relay traffic between the second network node 715 and the IAB-donor CU 705. In some aspects, the second network node 715 may be in an RRC connected state, an RRC inactive state, or an RRC idle state.

In some aspects, the first network node 710 may instantiate connectivity between a third network node (not shown) and the IAB-donor CU 705. The IAB-donor CU 705 may transmit at least one additional communication to the second network node 715 via the third network node. In some aspects, for example, the at least one additional communication may include a paging message for the second network node 715.

As indicated above, FIG. 7 is provided as an example. Other examples may differ from what is described with respect to FIG. 7.

Figure 8:
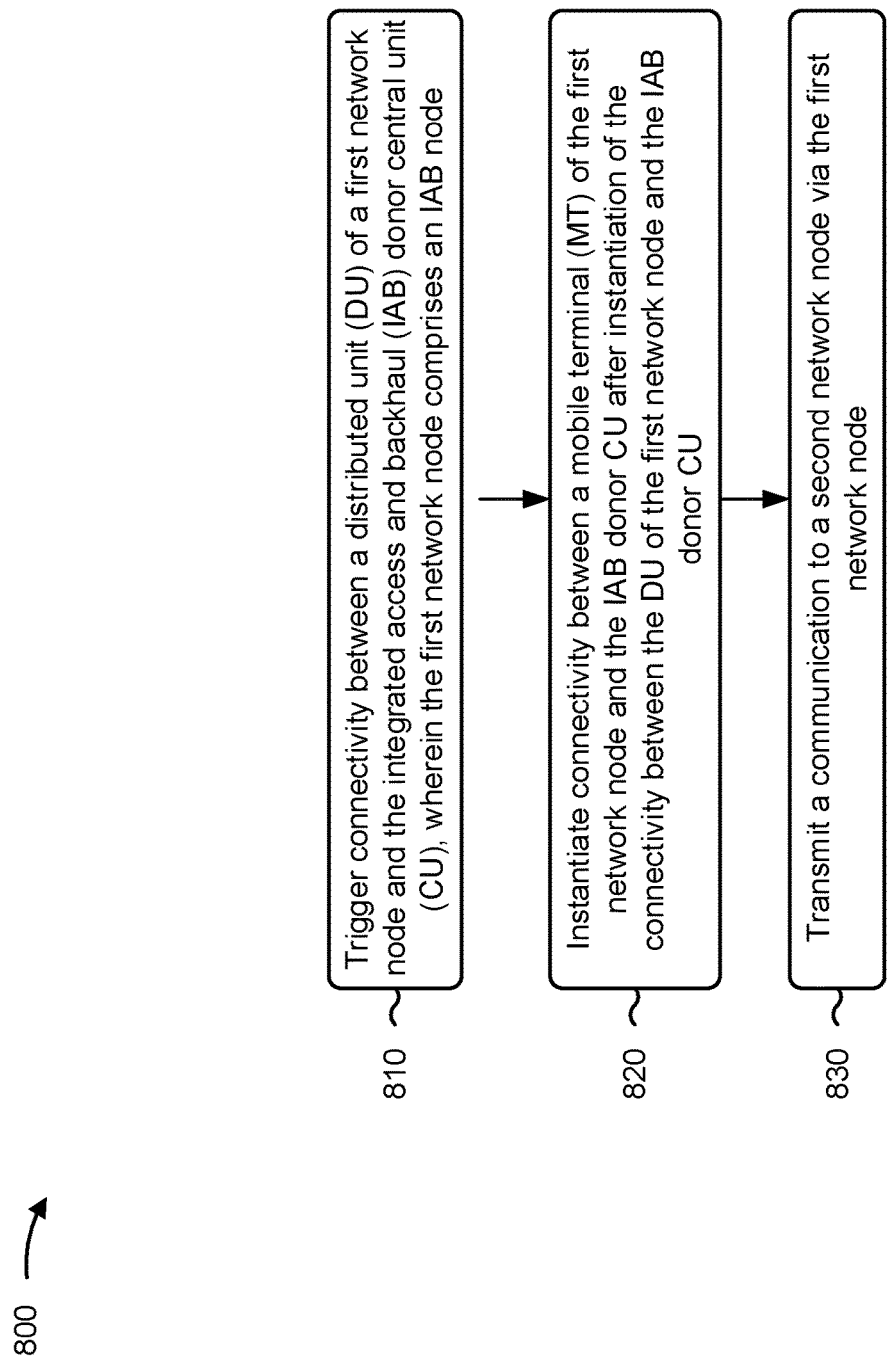
FIGS. 8 and 9 are diagrams illustrating example processes associated with on-demand connectivity in an IAB network, in accordance with the present disclosure.

FIG. 8 is a diagram illustrating an example process 800 performed, for example, by an IAB-donor CU, in accordance with the present disclosure. Example process 800 is an example where the IAB-donor CU (e.g., IAB-donor CU 705) performs operations associated with on-demand connectivity in an IAB network.

As shown in FIG. 8, in some aspects, process 800 may include triggering connectivity between a DU of a first network node and the IAB-donor CU, wherein the first network node comprises an IAB-node (block 810). For example, the IAB-donor CU (e.g., using communication manager 1008 and/or trigger component 1010, depicted in FIG. 10) may trigger connectivity between a DU of a first network node and the IAB-donor CU, wherein the first network node comprises an IAB-node, as described above, for example, with reference to FIG. 7.

As further shown in FIG. 8, in some aspects, process 800 may include instantiating connectivity between an MT of the first network node and the IAB-donor CU after instantiation of the connectivity between the DU of the first network node and the IAB-donor CU (block 820). For example, the IAB-donor CU (e.g., using communication manager 1008 and/or connectivity component 1012, depicted in FIG. 10) may instantiate connectivity between an MT of the first network node and the IAB-donor CU after instantiation of the connectivity between the DU of the first network node and the IAB-donor CU, as described above, for example, with reference to FIG. 7.

As further shown in FIG. 8, in some aspects, process 800 may include transmitting a communication to a second network node via the first network node (block 830). For example, the IAB-donor CU (e.g., using communication manager 1008 and/or transmission component 1004, depicted in FIG. 10) may transmit a communication to a second network node via the first network node, as described above, for example, with reference to FIG. 7.

Process 800 may include additional aspects, such as any single aspect or any combination of aspects described below and/or in connection with one or more other processes described elsewhere herein.

In a first aspect, process 800 includes instantiating the connectivity between the DU of the first network node and the IAB-donor CU.

In a second aspect, alone or in combination with the first aspect, instantiating the connectivity between the DU of the first network node and the IAB-donor CU comprises at least one of establishing an F1 interface between the DU of the first network node and the IAB-donor CU or activating the F1 interface.

In a third aspect, alone or in combination with one or more of the first and second aspects, instantiating the connectivity between the DU of the first network node and the IAB-donor CU comprises at least one of performing an F1 setup procedure or communicating at least one F1 AP message.

In a fourth aspect, alone or in combination with one or more of the first through third aspects, instantiating the connectivity between the MT of the first network node and the IAB-donor CU comprises establishing an RRC connection between the MT of the first network node and the IAB-donor CU.

In a fifth aspect, alone or in combination with one or more of the first through fourth aspects, instantiating the connectivity between the MT of the first network node and the IAB-donor CU comprises transitioning the MT of the first network node to an RRC connected state from at least one of an RRC idle state or an RRC inactive state.

In a sixth aspect, alone or in combination with one or more of the first through fifth aspects, trigger connectivity comprises paging the MT of the first network node.

In a seventh aspect, alone or in combination with one or more of the first through sixth aspects, process 800 includes receiving traffic for the second network node, wherein triggering connectivity comprises triggering connectivity based at least in part on receiving the traffic.

In an eighth aspect, alone or in combination with the seventh aspect, the IAB-donor CU comprises an IAB-donor CU CP and at least one IAB-donor CU UP, wherein receiving the traffic comprises receiving, using the IAB-donor CU CP, a traffic notification from the IAB-donor CU UP.

In a ninth aspect, alone or in combination with one or more of the first through eighth aspects, the second network node is a child of the first network node.

In a tenth aspect, alone or in combination with one or more of the first through eighth aspects, the second network node is a child of a child of the first network node.

In an eleventh aspect, alone or in combination with one or more of the first through tenth aspects, process 800 includes instantiating connectivity between a third network node and the IAB-donor CU, and transmitting at least one additional communication to the second network node via the third network node.

In a twelfth aspect, alone or in combination with the eleventh aspect, the at least one additional communication comprises a paging message for the second network node.

In a thirteenth aspect, alone or in combination with one or more of the first through twelfth aspects, the second network node is in an RRC connected state, an RRC inactive state, or an RRC idle state.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
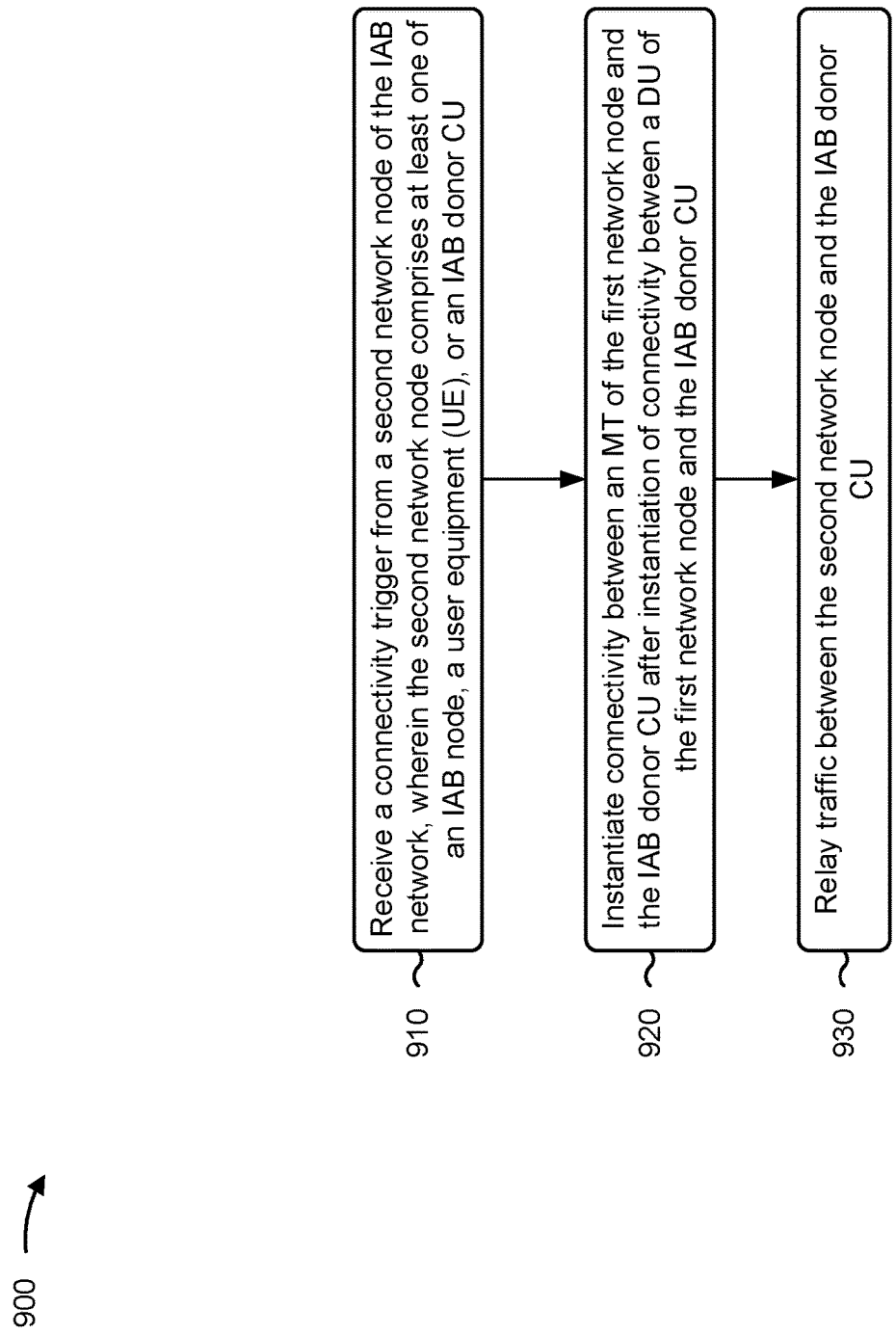

FIG. 9 is a diagram illustrating an example process 900 performed, for example, by a first network node, in accordance with the present disclosure. Example process 900 is an example where the first network node (e.g., first network node 710) performs operations associated with on-demand connectivity in an IAB network.

As shown in FIG. 9, in some aspects, process 900 may include receiving a connectivity trigger from a second network node of the IAB network, wherein the second network node comprises at least one of an IAB-node, a UE, or an IAB-donor CU (block 910). For example, the first network node (e.g., using communication manager 1108 and/or reception component 1102, depicted in FIG. 11) may receive a connectivity trigger from a second network node of the IAB network, wherein the second network node comprises at least one of an IAB-node, a UE, or an IAB-donor CU, as described above, for example, with reference to FIG. 7.

As further shown in FIG. 9, in some aspects, process 900 may include instantiating connectivity between an MT of the first network node and the IAB-donor CU after instantiation of connectivity between a DU of the first network node and the IAB-donor CU (block 920). For example, the first network node (e.g., using communication manager 1108 and/or connectivity component 1110, depicted in FIG. 11) may instantiate connectivity between an MT of the first network node and the IAB-donor CU after instantiation of connectivity between a DU of the first network node and the IAB-donor CU, as described above, for example, with reference to FIG. 7.

As further shown in FIG. 9, in some aspects, process 900 may include relaying traffic between the second network node and the IAB-donor CU (block 930). For example, the first network node (e.g., using communication manager 1108, reception component 1102, and/or transmission component 1104, depicted in FIG. 11) may relay traffic between the second network node and the IAB-donor CU, as described above, for example, with reference to FIG. 7.

Process 900 may include additional aspects, such as any single aspect or any combination of aspects described below and/or in connection with one or more other processes described elsewhere herein.

In a first aspect, process 900 includes instantiating the connectivity between the DU of the first network node and the IAB-donor CU.

In a second aspect, alone or in combination with the first aspect, instantiating the connectivity between the DU of the first network node and the IAB-donor CU comprises at least one of establishing an F1 interface between the DU of the first network node and the IAB-donor CU or activating the F1 interface.

In a third aspect, alone or in combination with one or more of the first and second aspects, instantiating the connectivity between the DU of the first network node and the IAB-donor CU comprises at least one of performing an F1 setup procedure or communicating at least one F1 AP message.

In a fourth aspect, alone or in combination with one or more of the first through third aspects, instantiating the connectivity between the MT of the first network node and the IAB-donor CU comprises establishing an RRC connection between the MT of the first network node and the IAB-donor CU.

In a fifth aspect, alone or in combination with one or more of the first through fourth aspects, instantiating the connectivity between the MT of the first network node and the IAB-donor CU comprises transitioning the MT of the first network node to an RRC connected state from at least one of an RRC idle state or an RRC inactive state.

In a sixth aspect, alone or in combination with one or more of the first through fifth aspects, receiving the connectivity trigger comprises receiving a paging message for the MT of the first network node from the IAB-donor CU.

In a seventh aspect, alone or in combination with one or more of the first through sixth aspects, receiving the connectivity trigger comprises receiving an indication of an access attempt of the second network node.

In an eighth aspect, alone or in combination with the seventh aspect, the access attempt corresponds to an attempt, by the second network node, to initiate at least one of an initial access procedure, a connection resume procedure, a connection reestablishment procedure, or a RACH procedure.

In a ninth aspect, alone or in combination with one or more of the first through eighth aspects, receiving the connectivity trigger comprises receiving traffic from the second network node.

In a tenth aspect, alone or in combination with one or more of the first through ninth aspects, the second network node is in an RRC connected state, an RRC inactive state, or an RRC idle state.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
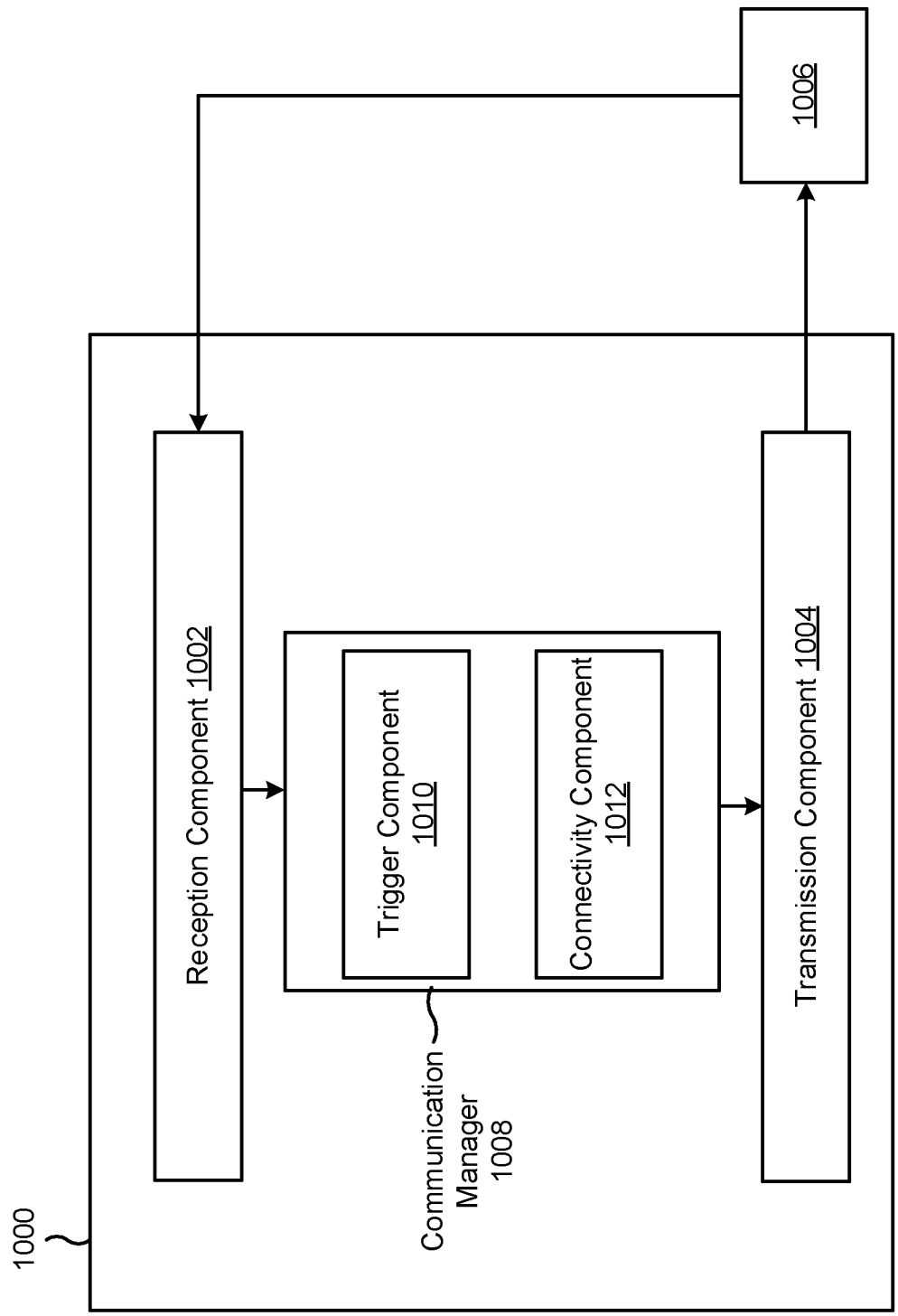
FIGS. 10 and 11 are diagrams of example apparatuses for wireless communication, in accordance with the present disclosure.

FIG. 10 is a diagram of an example apparatus 1000 for wireless communication. The apparatus 1000 may be a IAB-donor CU, or a IAB-donor CU may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may include one or more of a trigger component 1010 or a connectivity component 1012, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the IAB-donor CU described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The trigger component 1010 may trigger connectivity between a DU of a first network node and the IAB-donor CU, wherein the first network node comprises an IAB-node. In some aspects, the trigger component 1010 may include one or more antennas, a modem, a modulator, a transmit MIMO processor, a transmit processor, a controller/processor, a memory, or a combination thereof, of the base station described in connection with FIG. 2. In some aspects, the trigger component 1010 may include the reception component 1002 and/or the transmission component 1004.

The connectivity component 1012 may instantiate connectivity between an MT of the first network node and the IAB-donor CU after instantiation of the connectivity between the DU of the first network node and the IAB-donor CU. In some aspects, the connectivity component 1012 may include one or more antennas, a modem, a modulator, a transmit MIMO processor, a transmit processor, a controller/processor, a memory, or a combination thereof, of the base station described in connection with FIG. 2. In some aspects, the connectivity component 1012 may include the reception component 1002 and/or the transmission component 1004. The transmission component 1004 may transmit a communication to a second network node via the first network node.

The connectivity component 1012 may instantiate the connectivity between the DU of the first network node and the IAB-donor CU.

The reception component 1002 may receive traffic for the second network node, wherein triggering connectivity comprises triggering connectivity based at least in part on receiving the traffic.

The connectivity component 1012 may instantiate connectivity between a third network node and the IAB-donor CU.

The transmission component 1004 may transmit at least one additional communication to the second network node via the third network node.

The communication manager 1008 may manage any number of aspects of the operation of the reception component 1002, transmission component 1004, and/or connectivity component 1012. In some aspects, the communication manager 1008 may include one or more antennas, a modem, a modulator, a transmit MIMO processor, a transmit processor, a controller/processor, a memory, or a combination thereof, of the base station described in connection with FIG. 2. In some aspects, the communication manager 1008 may include the reception component 1002 and/or the transmission component 1004.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
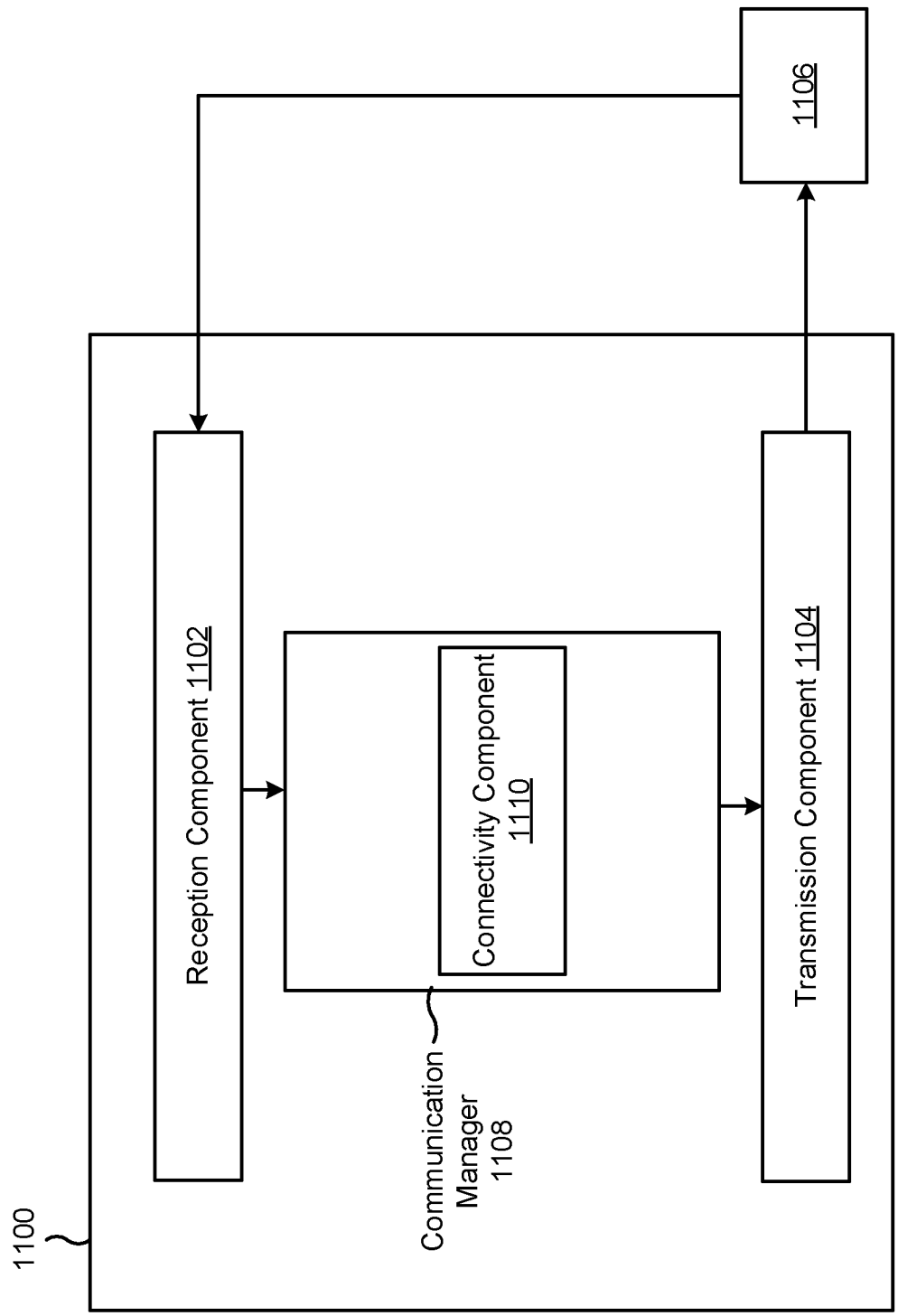

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may include a connectivity component 1110.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station and/or the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive a connectivity trigger from a second network node of the IAB network, wherein the second network node comprises at least one of an IAB-node, a UE, or an IAB-donor CU. The connectivity component 1110 may instantiate connectivity between an MT of the first network node and the IAB-donor CU after instantiation of connectivity between a DU of the first network node and the IAB-donor CU. In some aspects, the connectivity component 1110 may include one or more antennas, a modem, a modulator, a transmit MIMO processor, a transmit processor, a controller/processor, a memory, or a combination thereof, of the base station and/or the UE described in connection with FIG. 2. In some aspects, the connectivity component 1110 may include the reception component 1102 and/or the transmission component 1104.

The communication manager 1108, the reception component 1102, and/or the transmission component 1104 may relay traffic between the second network node and the IAB-donor CU. In some aspects, the communication manager 1108 may include one or more antennas, a modem, a modulator, a transmit MIMO processor, a transmit processor, a controller/processor, a memory, or a combination thereof, of the base station and/or the UE described in connection with FIG. 2. In some aspects, the communication manager 1108 may include the reception component 1102 and/or the transmission component 1104.

The connectivity component 1110 may instantiate the connectivity between the DU of the first network node and the IAB-donor CU.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by an integrated access and backhaul (IAB)-donor central unit (CU), comprising: triggering connectivity between a distributed unit (DU) of a first network node and the IAB-donor CU, wherein the first network node comprises an IAB-node; instantiating connectivity between a mobile terminal (MT) of the first network node and the IAB-donor CU after instantiation of the connectivity between the DU of the first network node and the IAB-donor CU; and transmitting a communication to a second network node via the first network node.

Aspect 2: The method of Aspect 1, further comprising instantiating the connectivity between the DU of the first network node and the IAB-donor CU.

Aspect 3: The method of Aspect 2, wherein instantiating the connectivity between the DU of the first network node and the IAB-donor CU comprises at least one of establishing an F1 interface between the DU of the first network node and the IAB-donor CU or activating the F1 interface.

Aspect 4: The method of either of Aspects 2 or 3, wherein instantiating the connectivity between the DU of the first network node and the IAB-donor CU comprises at least one of performing an F1 setup procedure or communicating at least one F1 application protocol (F1AP) message.

Aspect 5: The method of any of Aspects 1-4, wherein instantiating the connectivity between the MT of the first network node and the IAB-donor CU comprises establishing a radio resource control (RRC) connection between the MT of the first network node and the IAB-donor CU.

Aspect 6: The method of any of Aspects 1-5, wherein instantiating the connectivity between the MT of the first network node and the IAB-donor CU comprises transitioning the MT of the first network node to an RRC connected state from at least one of an RRC idle state or an RRC inactive state.

Aspect 7: The method of any of Aspects 1-6, wherein triggering connectivity comprises paging the MT of the first network node.

Aspect 8: The method of any of Aspects 1-7, further comprising receiving traffic for the second network node, wherein triggering connectivity comprises i triggering connectivity based at least in part on receiving the traffic.

Aspect 9: The method of Aspect 8, wherein the IAB-donor CU comprises an IAB-donor CU control plane (CP) and at least one IAB-donor CU user plane (UP), wherein receiving the traffic comprises receiving, using the IAB-donor CU CP, a traffic notification from the IAB-donor CU UP.

Aspect 10: The method of any of Aspects 1-9, wherein the second network node is a child of the first network node.

Aspect 11: The method of any of Aspects 1-9, wherein the second network node is a child of a child of the first network node.

Aspect 12: The method of any of Aspects 1-11, further comprising: instantiating connectivity between a third network node and the IAB-donor CU; and transmitting at least one additional communication to the second network node via the third network node.

Aspect 13: The method of Aspect 12, wherein the at least one additional communication comprises a paging message for the second network node.

Aspect 14: The method of any of Aspects 1-13, wherein the second network node is in a radio resource control (RRC) connected state, an RRC inactive state, or an RRC idle state.

Aspect 15: A method of wireless communication performed by a first network node of an integrated access and backhaul (IAB) network, comprising: receiving a connectivity trigger from a second network node of the IAB network, wherein the second network node comprises at least one of an IAB-node, a user equipment (UE), or an IAB-donor central unit (CU); instantiating connectivity between a mobile terminal (MT) of the first network node and the IAB-donor CU after instantiation of connectivity between a distributed unit (DU) of the first network node and the IAB-donor CU; and relaying traffic between the second network node and the IAB-donor CU.

Aspect 16: The method of Aspect 15, further comprising instantiating the connectivity between the DU of the first network node and the IAB-donor CU.

Aspect 17: The method of Aspect 16, wherein instantiating the connectivity between the DU of the first network node and the IAB-donor CU comprises at least one of establishing an F1 interface between the DU of the first network node and the IAB-donor CU or activating the F1 interface.

Aspect 18: The method of either of Aspects 16 or 17, wherein instantiating the connectivity between the DU of the first network node and the IAB-donor CU comprises at least one of performing an F1 setup procedure or communicating at least one F1 application protocol (F1AP) message.

Aspect 19: The method of any of Aspects 15-18, wherein instantiating the connectivity between the MT of the first network node and the IAB-donor CU comprises establishing a radio resource control (RRC) connection between the MT of the first network node and the IAB-donor CU.

Aspect 20: The method of any of Aspects 15-19, wherein instantiating the connectivity between the MT of the first network node and the IAB-donor CU comprises transitioning the MT of the first network node to an RRC connected state from at least one of an RRC idle state or an RRC inactive state.

Aspect 21: The method of any of Aspects 15-20, wherein receiving the connectivity trigger comprises receiving a paging message for the MT of the first network node from the IAB-donor CU.

Aspect 22: The method of any of Aspects 15-21, wherein receiving the connectivity trigger comprises receiving an indication of an access attempt of the second network node.

Aspect 23: The method of Aspect 22, wherein the access attempt corresponds to an attempt, by the second network node, to initiate at least one of: an initial access procedure, a connection resume procedure, a connection reestablishment procedure, or a random access channel (RACH) procedure.

Aspect 24: The method of any of Aspects 15-23, wherein receiving the connectivity trigger comprises receiving traffic from the second network node.

Aspect 25: The method of any of Aspects 15-24, wherein the second network node is in a radio resource control (RRC) connected state, an RRC inactive state, or an RRC idle state.

Aspect 26: An apparatus for wireless communication at a device, comprising a processor; memory coupled with the processor; and instructions stored in the memory and executable by the processor to cause the apparatus to perform the method of one or more of Aspects 1-14.

Aspect 27: A device for wireless communication, comprising a memory and one or more processors coupled to the memory, the one or more processors configured to perform the method of one or more of Aspects 1-14.

Aspect 28: An apparatus for wireless communication, comprising at least one means for performing the method of one or more of Aspects 1-14.

Aspect 29: A non-transitory computer-readable medium storing code for wireless communication, the code comprising instructions executable by a processor to perform the method of one or more of Aspects 1-14.

Aspect 30: A non-transitory computer-readable medium storing a set of instructions for wireless communication, the set of instructions comprising one or more instructions that, when executed by one or more processors of a device, cause the device to perform the method of one or more of Aspects 1-14.

Aspect 31: An apparatus for wireless communication at a device, comprising a processor; memory coupled with the processor; and instructions stored in the memory and executable by the processor to cause the apparatus to perform the method of one or more of Aspects 15-25.

Aspect 32: A device for wireless communication, comprising a memory and one or more processors coupled to the memory, the one or more processors configured to perform the method of one or more of Aspects 15-25.

Aspect 33: An apparatus for wireless communication, comprising at least one means for performing the method of one or more of Aspects 15-25.

Aspect 34: A non-transitory computer-readable medium storing code for wireless communication, the code comprising instructions executable by a processor to perform the method of one or more of Aspects 15-25.

Aspect 35: A non-transitory computer-readable medium storing a set of instructions for wireless communication, the set of instructions comprising one or more instructions that, when executed by one or more processors of a device, cause the device to perform the method of one or more of Aspects 15-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at an integrated access and backhaul (IAB) donor central unit (CU), comprising:
a memory; and
one or more processors, coupled to the memory, configured to:
trigger connectivity between a distributed unit (DU) of a first network node and the IAB-donor CU, wherein the first network node comprises an IAB-node;
instantiate the connectivity between the DU of the first network node and the IAB-donor CU;
instantiate connectivity between a mobile terminal (MT) of the first network node and the IAB-donor CU after instantiating the connectivity between the DU of the first network node and the IAB-donor CU; and
transmit a communication to a second network node via the first network node.

2. The apparatus of claim 1, wherein the one or more processors, to instantiate the connectivity between the DU of the first network node and the IAB-donor CU, are configured to establish an F1 interface between the DU of the first network node and the IAB-donor CU or activate the F1 interface.

3. The apparatus of claim 1, wherein the one or more processors, to instantiate the connectivity between the DU of the first network node and the IAB-donor CU, are configured to perform an F1 setup procedure or communicate at least one F1 application protocol (F1AP) message.

4. The apparatus of claim 1, wherein the one or more processors, to instantiate the connectivity between the MT of the first network node and the IAB-donor CU, are configured to establish a radio resource control (RRC) connection between the MT of the first network node and the IAB-donor CU.

5. The apparatus of claim 1, wherein the one or more processors, to instantiate the connectivity between the MT of the first network node and the IAB-donor CU, are configured to transition the MT of the first network node to an RRC connected state from at least one of an RRC idle state or an RRC inactive state.

6. The apparatus of claim 1, wherein the one or more processors, to trigger connectivity, are configured to page the MT of the first network node.

7. The apparatus of claim 1, wherein the one or more processors are further configured to receive traffic for the second network node, wherein the one or more processors, to trigger connectivity, are configured to trigger connectivity based at least in part on receiving the traffic.

8. The apparatus of claim 7, wherein the IAB-donor CU comprises an IAB-donor CU control plane (CP) and at least one IAB-donor CU user plane (UP), and wherein the one or more processors, to receive the traffic, are configured to receive, using the IAB-donor CU CP, a traffic notification from the IAB-donor CU UP.

9. The apparatus of claim 1, wherein the second network node is a child of the first network node.

10. The apparatus of claim 1, wherein the second network node is a child of a child of the first network node.

11. The apparatus of claim 1, wherein the one or more processors are further configured to:
instantiate connectivity between a third network node and the IAB-donor CU; and
transmit at least one additional communication to the second network node via the third network node.

12. The apparatus of claim 11, wherein the at least one additional communication comprises a paging message for the second network node.

13. The apparatus of claim 1, wherein the second network node is in a radio resource control (RRC) connected state, an RRC inactive state, or an RRC idle state.

14. An apparatus for wireless communication at a first network node of an integrated access and backhaul (IAB) network, comprising:
a memory; and
one or more processors, coupled to the memory, configured to:
receive a connectivity trigger from a second network node of the IAB network, wherein the second network node comprises at least one of an IAB-node, a user equipment (UE), or an IAB-donor central unit (CU);
instantiate connectivity between a distributed unit (DU) of the first network node and the IAB-donor CU;
instantiate connectivity between a mobile terminal (MT) of the first network node and the IAB-donor CU after instantiating the connectivity between DU of the first network node and the IAB-donor CU; and
relay traffic between the second network node and the IAB-donor CU.

15. The apparatus of claim 14, wherein the one or more processors, to instantiate the connectivity between the DU of the first network node and the IAB-donor CU, are configured to establish an F1 interface between the DU of the first network node and the IAB-donor CU or activate the F1 interface.

16. The apparatus of claim 14, wherein the one or more processors, to instantiate the connectivity between the DU of the first network node and the IAB-donor CU, are configured to perform an F1 setup procedure or communicate at least one F1 application protocol (F1AP) message.

17. The apparatus of claim 14, wherein the one or more processors, to instantiate the connectivity between the MT of the first network node and the IAB-donor CU, are configured to establish a radio resource control (RRC) connection between the MT of the first network node and the IAB-donor CU.

18. The apparatus of claim 14, wherein the one or more processors, to instantiate the connectivity between the MT of the first network node and the IAB-donor CU, are configured to transition the MT of the first network node to an RRC connected state from at least one of an RRC idle state or an RRC inactive state.

19. The apparatus of claim 14, wherein the one or more processors, to receive the connectivity trigger, are configured to receive a paging message for the MT of the first network node from the IAB-donor CU.

20. The apparatus of claim 14, wherein the one or more processors, to receive the connectivity trigger, are configured to receive an indication of an access attempt of the second network node.

21. The apparatus of claim 20, wherein the access attempt corresponds to an attempt, by the second network node, to initiate at least one of:
- an initial access procedure, a connection resume procedure, a connection reestablishment procedure, or
- a random access channel (RACH) procedure.

22. The apparatus of claim 14, wherein the one or more processors, to receive the connectivity trigger, are configured to receive traffic from the second network node.

23. The apparatus of claim 14, wherein the second network node is in a radio resource control (RRC) connected state, an RRC inactive state, or an RRC idle state.

24. A method of wireless communication performed by an integrated access and backhaul (IAB)-donor central unit (CU), comprising:
- triggering connectivity between a distributed unit (DU) of a first network node and the IAB-donor CU, wherein the first network node comprises an IAB-node;
- instantiating the connectivity between the DU of the first network node and the IAB-donor CU;
- instantiating connectivity between a mobile terminal (MT) of the first network node and the IAB-donor CU after instantiating the connectivity between the DU of the first network node and the IAB-donor CU; and
- transmitting a communication to a second network node via the first network node.

25. The method of claim 24, wherein instantiating the connectivity between the DU of the first network node and the IAB-donor CU comprises at least one of establishing an F1 interface between the DU of the first network node and the IAB-donor CU or activating the F1 interface, and wherein instantiating the connectivity between the MT of the first network node and the IAB-donor CU comprises establishing a radio resource control (RRC) connection between the MT of the first network node and the IAB-donor CU.

26. The method of claim 24, wherein instantiating the connectivity between the DU of the first network node and the IAB-donor CU comprises performing an F1 setup procedure or communicate at least one F1 application protocol (F1AP) message.

27. The method of claim 24, wherein instantiating the connectivity between the MT of the first network node and the IAB-donor CU comprises transitioning the MT of the first network node to a radio resource control (RRC) connected state from at least one of an RRC idle state or an RRC inactive state.

28. A method of wireless communication performed by a first network node of an integrated access and backhaul (IAB) network, comprising:
- receiving a connectivity trigger from a second network node of the IAB network, wherein the second network node comprises at least one of an IAB-node, a user equipment (UE), or an IAB-donor central unit (CU);
- instantiating connectivity between a distributed unit (DU) of the first network node and the IAB-donor CU;
- instantiating connectivity between a mobile terminal (MT) of the first network node and the IAB-donor CU after instantiating the connectivity between the of the first network node and the IAB-donor CU; and
- relaying traffic between the second network node and the IAB-donor CU.

29. The method of claim 28, wherein instantiating the connectivity between the DU of the first network node and the IAB-donor CU comprises performing an F1 setup procedure or communicate at least one F1 application protocol (F1AP) message.

30. The method of claim 28, wherein instantiating the connectivity between the MT of the first network node and the IAB-donor CU comprises transitioning the MT of the first network node to a radio resource control (RRC) connected state from at least one of an RRC idle state or an RRC inactive state.

\* \* \* \* \*